(12) United States Patent
Goldin

(10) Patent No.: US 7,375,436 B1
(45) Date of Patent: May 20, 2008

(54) GYROSCOPE-BASED ELECTRICITY GENERATOR

(76) Inventor: Aaron Goldin, 1141 Sycamore View Dr., Encinitas, CA (US) 92024

( * ) Notice: Subject to any disclaimer, the term of this patent is extended or adjusted under 35 U.S.C. 154(b) by 0 days.

(21) Appl. No.: 11/280,521

(22) Filed: Nov. 14, 2005

Related U.S. Application Data

(60) Provisional application No. 60/627,349, filed on Nov. 12, 2004.

(51) Int. Cl.
*F03B 13/10* (2006.01)
*F03B 13/12* (2006.01)
*H02P 9/04* (2006.01)
*F02B 63/04* (2006.01)
*F03G 7/08* (2006.01)
*H02K 7/18* (2006.01)
*F16H 33/00* (2006.01)

(52) U.S. Cl. ............................. 290/42; 290/1 R; 74/61
(58) Field of Classification Search ................ 290/1 R, 290/42; 74/61
See application file for complete search history.

(56) References Cited

U.S. PATENT DOCUMENTS

| | | | | |
|---|---|---|---|---|
| 1,992,457 A * | 2/1935 | Anderson, Jr. | ............... | 74/112 |
| 2,410,831 A * | 11/1946 | Maybarduk et al. | ......... | 342/74 |
| 2,412,961 A * | 12/1946 | Braddon | ...................... | 73/495 |
| 2,415,429 A * | 2/1947 | Kellogg et al. | ............. | 244/181 |
| 2,427,130 A * | 9/1947 | Ford | ........................... | 74/5.41 |
| 2,501,885 A * | 3/1950 | Barnes et al. | ............... | 74/5.44 |
| 2,592,643 A * | 4/1952 | Barnes | ....................... | 74/5.34 |
| 2,684,007 A * | 7/1954 | Newell | ........................ | 356/21 |
| 2,734,278 A * | 2/1956 | Hammond, Jr. | ............. | 33/328 |
| 2,968,956 A * | 1/1961 | Agins | ........................... | 74/5.9 |
| 3,203,644 A * | 8/1965 | Kellogg, Jr. | ................ | 244/165 |
| 3,558,936 A * | 1/1971 | Horan | ................... | 310/323.01 |
| 3,589,019 A * | 6/1971 | Culver | ........................ | 33/329 |
| 4,088,352 A * | 5/1978 | Kling | .......................... | 290/55 |
| 4,161,889 A * | 7/1979 | Hinds | ......................... | 74/5 R |
| 4,262,209 A * | 4/1981 | Berner | ........................ | 290/7 |
| 4,266,434 A * | 5/1981 | Burns | .......................... | 74/61 |
| 4,288,986 A * | 9/1981 | Watson | ....................... | 60/501 |
| 4,295,381 A * | 10/1981 | Hinds | ......................... | 74/5 R |
| 4,352,023 A * | 9/1982 | Sachs et al. | ................. | 290/42 |
| 4,365,437 A * | 12/1982 | Jameson | .................... | 446/355 |
| 4,423,334 A * | 12/1983 | Jacobi et al. | ................ | 290/53 |
| 4,484,083 A * | 11/1984 | Jefferies | ...................... | 290/45 |
| 4,642,988 A * | 2/1987 | Benson | ................... | 60/641.14 |
| 4,720,640 A * | 1/1988 | Anderson et al. | ............ | 290/43 |
| 5,014,564 A * | 5/1991 | Culkin | ......................... | 74/61 |
| 5,123,292 A * | 6/1992 | Woltering | ..................... | 74/87 |
| 5,129,600 A * | 7/1992 | Polites | ................... | 244/173.1 |
| 5,158,493 A * | 10/1992 | Morgrey | .................... | 446/355 |
| 5,172,599 A * | 12/1992 | Woltering | ...................... | 74/61 |
| 5,313,850 A * | 5/1994 | Finvold et al. | ............... | 74/5.9 |
| 5,396,815 A * | 3/1995 | Polites et al. | .................. | 74/61 |
| 5,631,514 A * | 5/1997 | Garcia et al. | .............. | 310/309 |
| 5,818,115 A * | 10/1998 | Nagao | ........................ | 290/31 |

(Continued)

*Primary Examiner*—Julio Gonzalez
*Assistant Examiner*—Pedro J Cuevas
(74) *Attorney, Agent, or Firm*—Fish & Richardson P.C.

(57) ABSTRACT

Techniques and devices that use precession of at least one spinning gyroscope to drive a motor generator to produce electricity from an oscillating motion that causes the precession of the gyroscope. A buoy may be used to produce the oscillating motion from the motion of water waves so that electricity may be produced from motion of water waves. An oscillating motion caused by other sources, such as wind, may also be used to generate electricity.

30 Claims, 12 Drawing Sheets

U.S. PATENT DOCUMENTS

| | | | |
|---|---|---|---|
| 5,955,801 A * | 9/1999 | Romero et al. | 310/40 MM |
| 5,959,375 A * | 9/1999 | Garcia | 310/40 MM |
| 5,994,801 A * | 11/1999 | Garcia | 310/40 MM |
| 6,640,659 B1 * | 11/2003 | Jegatheeson | 74/5.22 |
| 6,860,166 B2 * | 3/2005 | Hintz | 74/5.47 |
| 6,876,095 B2 * | 4/2005 | Williams | 290/1 R |
| 6,926,595 B2 * | 8/2005 | Pollak et al. | 451/270 |
| 6,956,299 B2 * | 10/2005 | Serrano Molina et al. | 290/42 |
| 7,003,947 B2 * | 2/2006 | Kanki | 60/398 |
| 7,105,939 B2 * | 9/2006 | Bednyak | 290/42 |
| 7,124,656 B2 * | 10/2006 | Miller | 74/5.1 |
| 7,239,038 B1 * | 7/2007 | Zimmerman et al. | 290/54 |
| 2003/0052564 A1 * | 3/2003 | Wilsdorf | 310/179 |
| 2003/0067245 A1 * | 4/2003 | Pelrine et al. | 310/311 |
| 2003/0220058 A1 * | 11/2003 | Pollak et al. | 451/357 |
| 2004/0217671 A1 * | 11/2004 | Rosenthal et al. | 310/328 |
| 2004/0222637 A1 * | 11/2004 | Bednyak | 290/1 R |
| 2004/0222638 A1 * | 11/2004 | Bednyak | 290/1 R |
| 2006/0178829 A1 * | 8/2006 | Gaiffe | 701/213 |
| 2007/0050139 A1 * | 3/2007 | Sidman | 701/220 |
| 2007/0075545 A1 * | 4/2007 | Wilson et al. | 290/1 R |
| 2007/0138793 A1 * | 6/2007 | Zimmerman et al. | 290/1 R |
| 2007/0228736 A1 * | 10/2007 | Smushkovich | 290/42 |

* cited by examiner

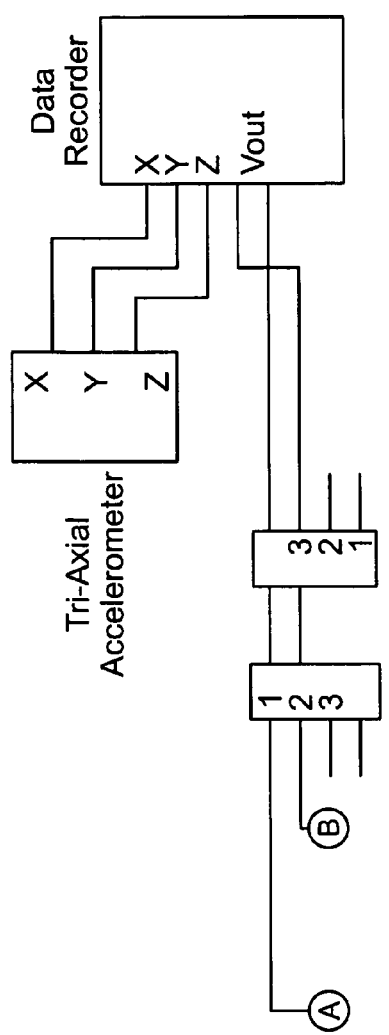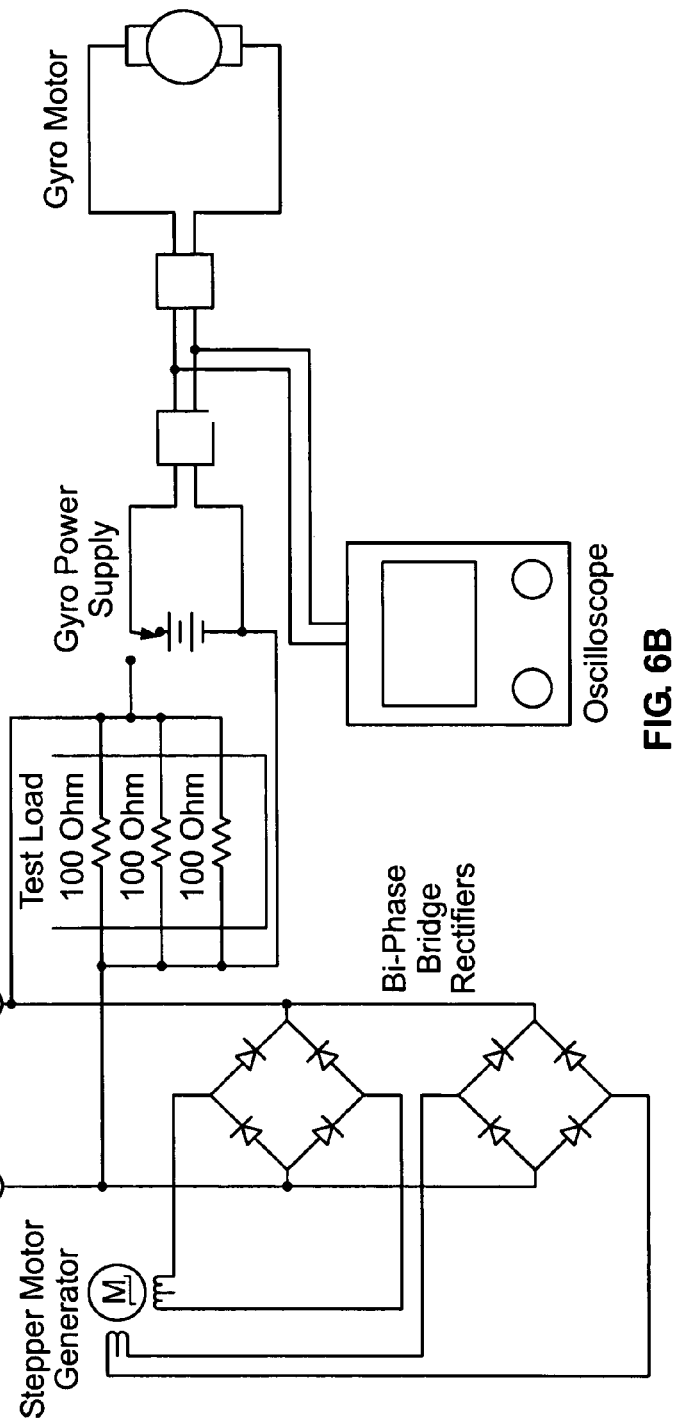
FIG. 6A
FIG. 6B

Gyroscopic Wave Powered Generator
Block Diagram

Gyroscopic Wave Powered Generator Block Diagram

GYROSCOPE-BASED ELECTRICITY GENERATOR

This application claims the benefit of U.S. Provisional Application No. 60/627,349 entitled "GYROSCOPE-BASED ELECTRICITY GENERATOR" and filed Nov. 12, 2004, which is incorporated herein by reference in its entirety as part of the specification of this application.

BACKGROUND

This application relates to conversion of energy of a mechanical motion into electrical energy.

Energy is a valuable resource. A variety of techniques have been and are being developed to generate energy from various sources, such as the coal, oil, natural gas, hydrogen, sunlight, wind, and ocean waves. Certain energy resources are limited on earth and are not renewable. Examples of such energy sources include the fossil fuels like coal, oil, and natural gas, and nuclear fuels such as uranium. The fossil fuels, uranium and other non-renewable energy sources will eventually be depleted on earth by continuous exploration and use. The consumption and use of many non-renewable energy sources such as fossil fuels and nuclear fuels are also known for causing pollutions to the environments.

In contrast, certain other energy resources, such as the sunlight, wind, and ocean waves, are practically unlimited in their supply and may be utilized in ways that can significantly reduce or minimize adverse impacts to the environments and the earth's ecological systems. Therefore, techniques, devices and systems for obtaining energy from various sources other than fossil fuels and nuclear fuels are desirable to preserve earth's natural resources, to reduce pollution to the environments, and to expand energy supply sources in order to provide sustainable energy supply to humans.

For example, the motion of water waves in a large body of water, e.g., lakes, rivers, and oceans, may be used to generate electricity. Oceans, in particular, have an enormous potential as a source of energy in part because oceans cover over 70% of the earth's surface and are estimated to have an annual capacity of about 2000 tera watt-hour in the surface wave energy alone.

SUMMARY

This application describes implementations of techniques and devices that use a spinning gyroscope to convert an oscillating torque caused by an oscillating motion into a continuous torque acting on an electromagnetic motor generator and thus cases a continuous rotation of the electromagnetic motor generator which generates electricity. In one implementation, for example, a method is described to use a spinning gyroscope to convert an oscillating motion into a continuous rotation motion and to cause the continuous rotation motion to activate an electromagnetic motor-generator to generate electricity.

In another implementation, an exemplary device is described to include a base reactive to an oscillating motion acting on the base; a gyroscope engaged to the base and operable to precess in response to the oscillating motion of the base when the gyroscope is spinning; an electromagnetic motor-generator to rotate and to generate electricity; and a coupling unit coupled between the gyroscope and the electromagnetic motor-generator to transfer the precession of the gyroscope to continuous rotation of the electromagnetic motor-generator, thus converting energy of the oscillating motion into electricity.

In yet another implementation, a device is described to include a floating device to float in water and a base engaged to the floating device to be substantially parallel to a water surface at a location where the base is located. This device includes a gyroscope engaged to the base and operable to precess, when the gyroscope is spinning, in response to an oscillating motion of the base when floating on the water. An electromagnetic motor-generator is engaged to the base and to rotate around a motor rotation axis that is perpendicular to the base. This device includes crank arm engaged to the electromagnetic motor-generator and operable to rotate the electromagnetic motor-generator and engaged to the gyroscope so that an axis of the spinning of the gyroscope is parallel to the crank arm. The crank arm is operable to transfer the precession of the gyroscope into continuous rotation of the electromagnetic motor-generator, thus converting energy of the oscillating motion into electricity. A control module is coupled to control spinning of the gyroscope according to a frequency of the oscillating motion.

These and other implementations are described in greater detail in the attached drawings, the detailed description and the claims.

BRIEF DESCRIPTION OF DRAWINGS

FIGS. 6A and 6B show exemplary circuits for the rotary motor generator and the driver circuit for the gyro motor, respectively, in a simplified testing prototype for the design in FIG. 4.

DETAILED DESCRIPTION

Figure 1:
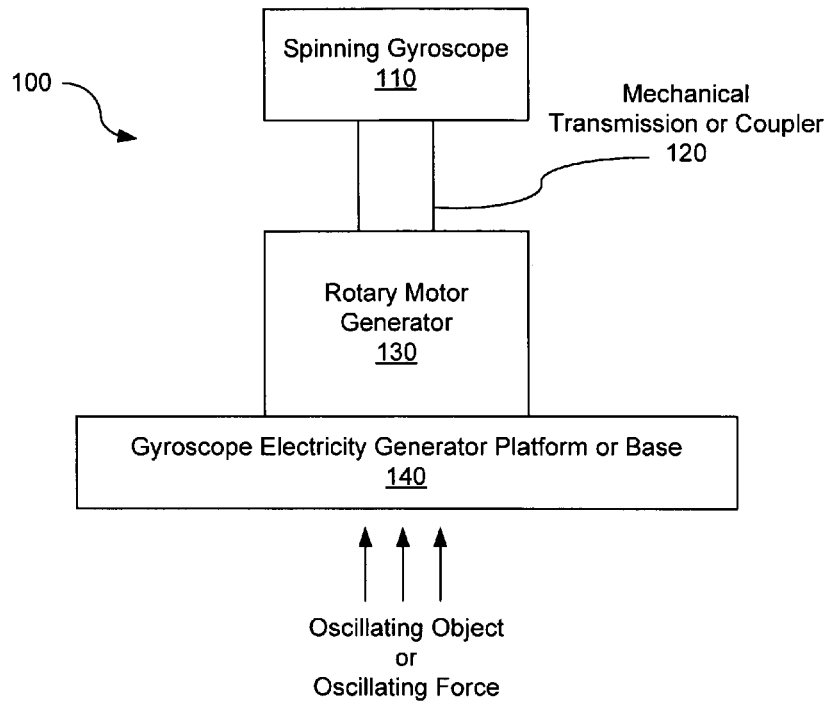
FIGS. 1 and 2 illustrate one implementation of a gyroscope generator that converts energy of an oscillating motion into the electricity.

The techniques and devices described in this application use a spinning gyroscope to convert an oscillating torque caused by an oscillating motion into a continuous torque acting on an electromagnetic motor generator and thus cases a continuous rotation of the electromagnetic motor generator. The electromagnetic motor generator generates electricity from the continuous rotation. A coupling mechanism is provided to transfer or transform the precession motion of the spinning gyroscope under the oscillating torque into the continuous rotation of the motor generator. As described in detail below, the use of the spinning gyroscope and the coupling mechanism can be implemented in simple and efficient configurations that convert the energy of an oscillating motion into electricity for a variety of applications.

The implementation of the combination of the spinning gyroscope and the coupling mechanism may be adapted different to efficiently interact with different forms of oscillating motions. For example, the oscillating motion may be caused by a natural phenomenon such as water waves in, e.g., oceans and winds. Specific examples are described here for designs that directly convert the periodic torque of oscillating surface waves in a body of water such as ocean waves into the continuous torque acting on a rotary electric generator which in turn generates electricity. The spinning gyroscope, which sometimes may be used as an inertial frame of reference such as a horizontal spinning top, is configured to continuously precess harmonically to the oscillating motion of the ocean waves, usually with varying amplitudes and periods. This precession of the spinning gyroscope is then used to drive the rotary motor generator to continuously rotate and thus generate electricity. The entirety or a portion of the generated electricity may be directly used to power an electric load or device. The entirety or a portion of the generated electricity may also be used to charge up a rechargeable battery to store the generated energy or be stored in other energy storage device. In some applications, the generated electricity may be partially used to drive an electric load or device while the remainder of the generated electricity is being stored.

In certain implementations, the spinning motion of the gyroscope may be initiated or initially powered by a power supply such as a battery. After the initial spinning of the gyroscope, the combined operation of the spinning gyroscope and the coupling mechanism generate electricity from a specific oscillating motion with which the system is designed to interact. While a portion of or the most of the generated electricity may be sent to the storage device or may be used to drive the electric load, a portion of the generated electricity from the rotary electric generator is partitioned out of the generated electricity and is used to power the spinning motion of the gyroscope. Therefore, after the initial powering by the power supply, the gyroscope may be controlled to cease receiving energy from the power supply after the partitioned portion of the electricity generated by the motor is sufficient to maintain spinning of the gyroscope. The power supply for the initial spinning of the gyroscope may be a rechargeable battery that can be recharged by the generated electricity. Therefore, under this particular design, a gyroscope-based generator may be a self-powered, autonomous system when the spinning gyroscope, the precession of the gyroscope and the oscillating motion are in phase and in resonance with one another.

In other implementations, gyroscope-based generators based on the present combined operation of the spinning gyroscope and the coupling mechanism may be configured to initiate the spinning of the gyroscope without using energy from a power supply. The oscillating motion caused by a suitable source such as the ocean waves or winds can be used to cause the coupling mechanism to rotate the rotary electromagnetic motor generator to generate the electricity. This electricity is then used to spin up the gyroscope until the spinning gyroscope, the precession of the gyroscope and the oscillating motion are in phase and in resonance with one another. After this initial spin-up of the gyroscope, a part of the generated electricity is used to sustain the spinning of the gyroscope while the remaining part of the generated electricity is used to drive an electric load or to be stored in a storage device.

FIG. 1 illustrates one example of a gyroscope-based generator 100 described in this application. A platform or base member 140 is provided to interact with an oscillating object or an oscillating force and to support a gyroscope 110 and an electromagnetic rotary motor generator 130. The oscillating motion of the platform or base member 140 causes an oscillating torque to be applied to the spinning gyroscope 110 and thus maintains the precession of the gyroscope 110. When the gyroscope 110 spins around its own spinning axis, the oscillating torque acts on the gyroscope 110 as an external torque and causes the gyroscope 110 to precess. A coupling mechanism 120, e.g., a mechanical transmission or coupler, is coupled between the precessing gyroscope 110 and the rotary motor 130 to transfer the precession of the gyroscope 110 to the rotation of the rotary motor 130. The rotation energy of the rotary motor 130 is converted into electricity.

Figure 2:
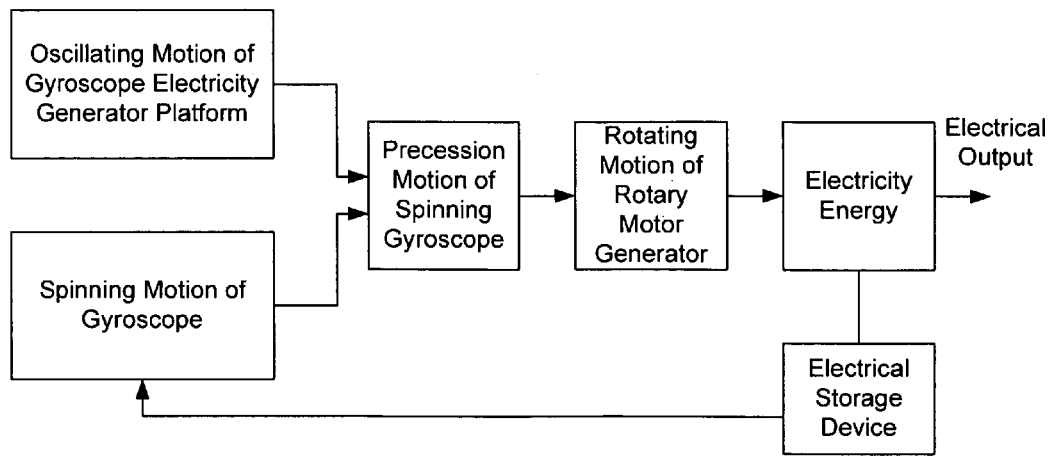

FIG. 2 illustrates the energy conversion in the gyroscope generator 100. The oscillating motion of the platform 140 and the spinning motion of the gyroscope 110 are coupled to each other to cause precession of the spinning gyroscope 110. This coupling essentially converts the energy of the oscillating motion of the platform 140 into the energy of the precession of the spinning gyroscope 110. The precession of the spinning gyroscope 110 is then converted by the coupling mechanism 120 into a continuous rotation of the rotary motor 130 which produces the electricity energy from the rotation. The generated electricity is then used to power a load or device or is stored in a rechargeable battery. As illustrated, a portion of the generated electricity may be used to power and maintain the spinning of the gyroscope 110.

Figure 3:
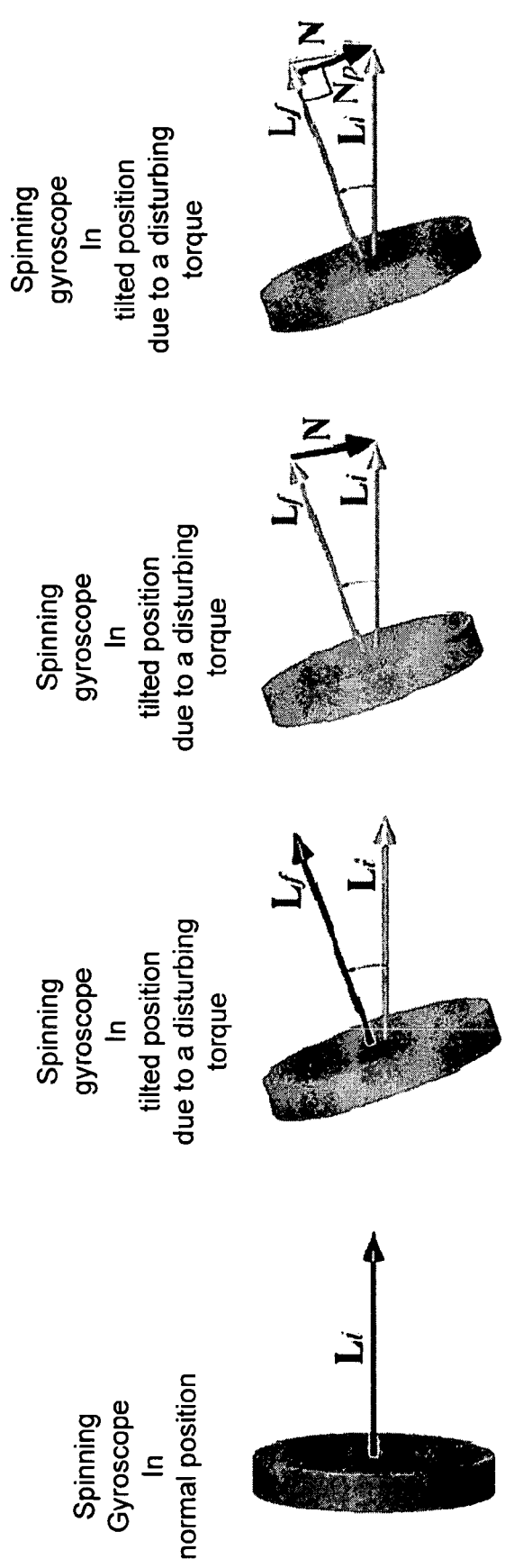
FIG. 3 illustrates operation of a spinning gyroscope under a disturbing torque.

FIG. 3 shows a simple gyroscope 110 that may be used in the device 100 in FIG. 1. The gyroscope 110 operates based on the Newton's principle that a massive rapidly spinning body rigidly resists perturbation and reacts to a disturbing torque by precessing or rotating slowly around a precession axis orthogonal to the axis of the disturbing torque and the axis of the gyroscope's spin vector. As illustrated, the angular momentum of the gyroscope 110 can be represented by a vector ($L_i$) along the axis of the spinning rotation. When the angle ($\theta$) of the gyroscope 110 changes due to an external disturbing torque, the angular momentum vector changes. While the magnitude of the angular momentum (L) is constant, the initial angular momentum ($L_i$) and the final angular momentum ($L_f$) differ. Thus, due to the conservation of angular momentum, a resultant angular momentum vector (N) is introduced and the sum of N and $L_f$ is equal to $L_i$.

The change in the component of N, ($N_p$), oriented along the axis of precession, which is the crank arm axis in an example described below, is $\|N_p\|=L \sin(\theta)$ for one quarter of a full cycle. Because $N_p$ is the change in $L_i$ that contributes to the torque turning the crank arm of the device 100, and the average torque $$\tau = \frac{\Delta L}{\Delta t}$$

can be expressed as follows:

$$\tau = 4Lf \sin(\theta),$$

where f is the frequency of the oscillating object or force such as ocean waves. Thus the theoretical input power from the torque caused by the oscillating object or force is:

$$P_{in} = 8\pi f^2 L \sin \theta.$$

As an example, consider an implementation of the design in FIG. 1 where a crank arm is used as the coupling mechanism 120 between the gyroscope 110 and the rotary motor 130. If the gyroscope 110 spins at a gyro rate of 90 r.p.s. and the frequency of the wave stimulator which simulates ocean waves to rock the device 100 is 1.25 Hz, the gyroscope generator 100 in FIG. 1 can generate 0.817 W of electricity for a wave angle of 20° and a crank arm of a radius at 0.1 meter.

Figure 4:
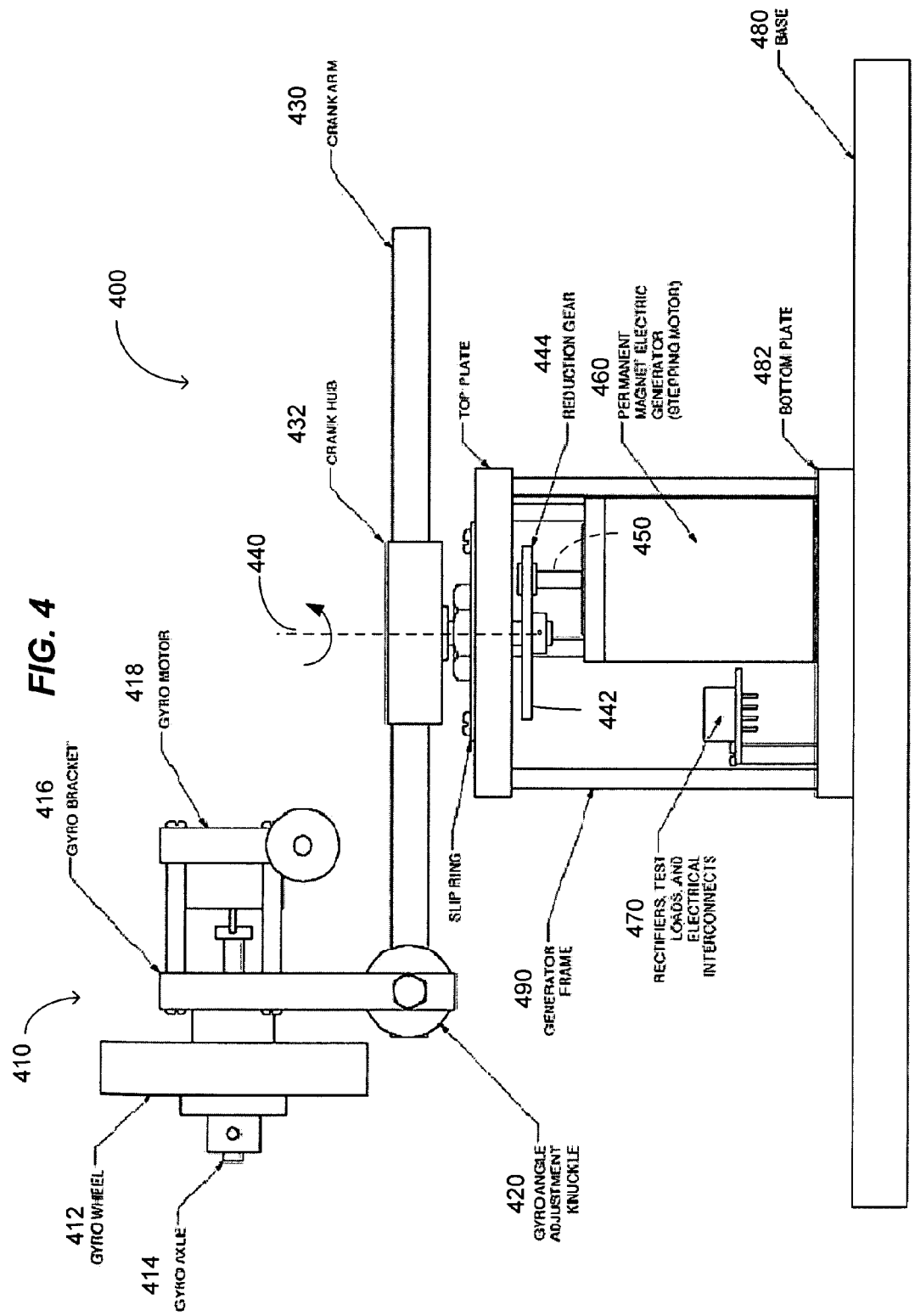
FIG. 4 shows one example of a specific design of the gyroscope generator in FIG. 1.

FIG. 4 illustrates one exemplary implementation of the gyroscope generator 400 based on the design in FIG. 1. The gyroscope generator 400 includes a gyroscope 410 with a gyro wheel 412 driven by a gyro motor 418, a rotary motor generator 460, and a crank arm 430 as part of the coupling mechanism to transfer the precession of the gyroscope 410 to the rotation of the rotary motor generator 460. The entire system is mounted on a base 480.

The gyro wheel 412 of the gyroscope 410 is mounted to spin around a gyro axle 414 that is substantially parallel to the crank arm 430 and to the base 480. The gyro axle 414 is engaged to and is rotated by the gyro motor 418 to cause the gyro wheel 412 to spin. A gyroscope power supply, such as a battery, may be used to supply the electrical power to the gyro motor 418 for, at the minimum, initiating the spin of the gyro wheel 412 so that the oscillating motion of the base 408 can cause the gyroscope 410 to precess. A gyro bracket 416 is structured to hold the gyro wheel 412, the gyro axle 414, and the gyro motor 418 together as the assembled gyroscope 410. A mechanical coupler or coupling element 420 may be used to engage the gyro bracket 416 to the crank arm 430. In this configuration, as the gyroscope 410 precesses in response to the external oscillating motion exerted on the generator 400, the precession motion of the gyroscope 410 causes the crank arm 430 to rotate via the coupling element 420.

The crank arm 430 in the illustrated example is engaged to a first rotational axel 440 that is substantially perpendicular to the crank arm 430 and the gyro axel 414. When the gyroscope 410 precesses, the crank arm 430 rotates around the axel 440 along with the precession of the gyroscope 410. The crank arm 430 may be configured in various geometries. For example, the crank arm 430 may be a circular plate with its center engaged to the axel 440 so that the plate spins or rotates around the axel 440. The crank arm 439 includes a crank hub 432 that is engaged to the axel 440. The gyroscope 410 may be positioned on the crank arm 430 off the first axel 440, or alternatively, near or at the axel 440. The axel 440 may be the rotary axel of the rotary motor generator 460. In the illustrated example, a pair of reduction gears 442 and 444 are used to transfer the rotation of the axel 440 to the rotation of a second, substantially parallel axel 450 which is the rotary axel of the motor generator 460. The gear 442 is engaged to rotate with the axel 440 and the gear 444 is engaged to rotate with the axel 450. The gears 442 and 444 are engaged to each other so their rotary motions are synchronized and may be sized with different diameters, e.g., the diameter of the gear 442 is greater than that of the gear 444, to rotate the motor 460 at a higher angular velocity than the axel 440. Therefore, in the illustrated example, the combination of the crank arm 430, the axel 440, the pair of reduction gears 442 and 444 forms the coupling mechanism 120 in FIG. 1. Other suitable implementations of the coupling mechanism 120 may be used.

The gyroscope generator 400 is further shown to use a generator frame 490 on a bottom plate 482 to hold the motor 460, the reduction gears 442 and 444, and the first axel 440. Electrical connectors and circuits (e.g., rectifiers) 470 for the rotary motor generator 460 may also be placed in the generator frame 470. The bottom plate 482 may be directly engaged to the base 480.

The gyroscope generator 400 may be adapted to interact with various oscillating motions to generate electricity. For example, the base 480 or an extension connected to the base 480 may be used to interact with wind to cause the base 480 to oscillate with the wind and to generate electricity. As another example, a floating device or a buoy may be engaged to the base 408 and the entire system can float on the ocean to generate electricity from the oscillating motion of the ocean waves.

Figure 5:
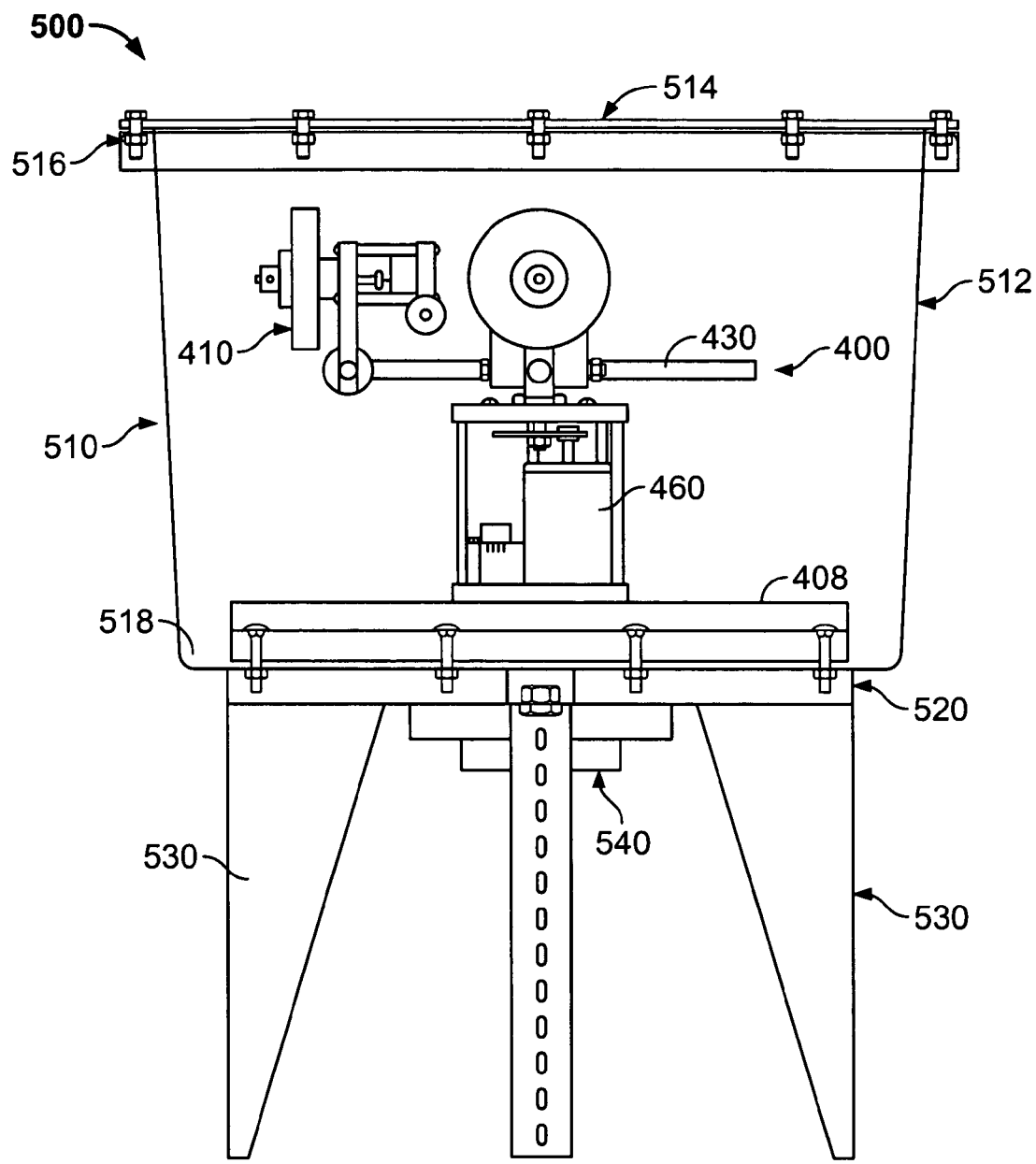
FIG. 5 shows one example of a gyroscope generator for converting energy of ocean waves into electricity based on the design in FIG. 4.

FIG. 5 shows an example of a buoy gyroscope generator 500. A waterproof chamber or housing 510 is provided to enclose the generator 400 in FIG. 4. The housing 510 includes a buoy hull 512 with a bottom 518 and a top opening that is sealed by a lid 514. A Teflon gasket 516 and fasteners may be used to engage the lid 514 to the top opening and to provide a waterproof seal. The base 408 of the gyroscope generator 400 is fixed to the bottom 518 of the housing 510 to facilitate the energy transfer from the motion of the waves to the motion of the housing 510. In operation, the housing 510 floats on the water surface to keep the bottom 518 and thus the base 408 to be parallel to the water surface when the water is calm without waves. When waves are present in the water, the up-and-down oscillating motion of the waves causes the gyroscope generator 400 inside the housing 510 to move accordingly with the waves and this motion of the gyroscope generator 400 in turn causes the gyroscope 410 to precess and to rotate the crank arm 430 which turns the rotary motor generator 460.

The housing 510 may be engaged to a set of elongated plates or blades, which extend vertically into the water, to provide lateral stability of the housing 510 and to ensure that the bottom 518 of the housing 510 faces downward. As illustrated in FIG. 5, a set of radial keel blades 530, e.g., four blades, may be engaged to the bottom portion of the housing 510 via keel attachments struts or other suitable fasteners 520. These blades interact with water to transfer the water wave motion into the motion of the housing 510. Hence, the up and down circulating movement of the waves rocks the housing 510 and causes the precession of the gyroscope 410 inside the housing 510. In addition, additional weights 540 may be attached to the bottom side of the housing 510 to further stabilize the system in the upright position.

In the designs shown in FIGS. 4 and 5, the angular momentum of the gyroscope 410 can be computed by L=Iω, where I is the moment of inertia of the gyro wheel, and ω is the spinning angular velocity of the gyroscope. As an example, if the gyro wheel of the gyroscope 410 is a ring, the moment of the ring is given by:

$$I = \frac{1}{2} M_1 R_1^2 - \frac{1}{2} M_2 R_2^2$$

where $M_1$ is the projected mass of a disk with the outer radius of the ring, and $M_2$ is the projected mass of a disk with the inner radius of the ring, and $r_1$ and $r_2$ are the outer and inner radii, respectively.

Consider a specific configuration for the above example as follows:

M=0.47 [kg], $r_1$=0.046 [m], $r_2 = 0.03$ [m], $M/m^2 = 123.031$ [kg/m$^2$], $M_1 = 0.817862$ [kg] and $M_2 = 0.347862$ [kg], The moment is $I = 0.000709$ [kg·m$^2$], the angular momentum is $L = I\omega = 0.400794$ [kg·m$^2$ω] and the input power for spinning the gyroscope is $P_{in} = 8\pi f^2 L \sin(\theta) = 5.383$ [W]. The gyroscope 410 in the designs shown in FIGS. 4 and 5 is offset to the crank arm axis 440 so that there is a small addition of power from the potential energy of the height of the gyroscope 410 due to gravity introduced every cycle. This part of the contribution can be expressed by $P_{gravity} = 4rMg \sin(\theta)f$, where g is the acceleration of gravity. For the specific numbers used above, $P_{gravity} = 0.788$ [W]. Accordingly, the total input power to the system is 6.171 [W]. In a simplified testing prototype generator based on the above numbers, the measured electrical load power $P_{load}$ is 0.817 W. Therefore, the efficiency of the prototype generator, $P_{load}/P_{in}$, is 0.817 [W]/6.171 [W]=0.132, or 13.2%.

FIGS. 6A and 6B illustrate exemplary circuits for the rotary motor generator and the driver circuit for the gyro motor that spins the gyroscope, respectively, in a simplified testing prototype. In this example, a gyro power supply such as a battery is provided to supply the electrical power to initially spin up the gyroscope. A tri-axial accelerometer is used to measure the motion of the prototype platform. An oscilloscope is used to measure the rate of rotation of the gyroscope. The motor-generator energizes the test load and can be switched to provide power to the gyroscope motor in FIG. 6B. A data recorder records the accelerometer and generator outputs.

The designs in FIGS. 4 and 5 may be configured with the capability to resonate at different wave frequencies under simple controls. The system resonates when the wave frequency and the gyroscopic precession frequency are the same or are sufficiently close to each other to be in resonance with each other. This resonant condition occurs when the torque that the gyroscope 410 exerts on the generator crank arm 430 with respect to the crank arm axis is equal but opposite to the torque the generator 400 exerts on the gyroscope 410. Under the resonance condition, the ratio between torque and angular momentum can be expressed as $\tau/L = 4f \sin(\theta)$.

As long as this ratio is maintained during operation, the device can resonate at any given wave frequency and angle.

A simple prototype, Gyro-Gen, based on the designs in FIGS. 4 and 5 was successfully built and tested. The main components of this prototype are a gyroscope (adapted from a Sony capstan flywheel, shaft, and bearing set), a gyro motor with 9V DC and 20 ohms impedance, a crank arm made of a 1.27×28.3 cm aluminum rod, an electric generator (adapted from a 4-phase synchronous motor Superior Electric model MD62-FC09/1.7 V/4.7 A/65 oz·in torque), a control circuit (10A Schottky diode rectifiers), and a housing. The gyroscope is attached to a crank arm so that the torque generated is perpendicular to the change in angle due to the buoyant wave force on the hull. The spinning gyro's angular velocity is electronically varied to change the precessional torque on the crank arm in order to adapt the device to different wave frequencies. In various tests conducted in the prototype, frictional and electrical losses were minimized by using low friction bearings for the gyro, matching the electric generator's impedance to the load, and using Schottky diodes for the rectifiers.

In testing the prototype Gyro-Gen, a motion controlled test frame was built as a wave simulator to simulate the rocking motion of the device when floated on the ocean. The test frame includes a brushless torque motor and programmed to simulate ⅔ to 4-second period ocean waves. An 8-channel data recorder (Persistor, Inc. CF2) was mounted on the test frame to record 20 samples per second electrical output power and output of a 3-axis accelerometer (Crossbow CXL04LP3) mounted below the crank arm shaft. Data analysis software was written using Matlab.

The Gyro-Gen was tested with varying wave periods, fixing tilt, electrical load, gyro rate, and crank arm offset to obtain measures of the output power as a function of the angular velocity. The gyro spinning rate was varied by 20 r.p.s. between successive runs. Before each run, the gyro was spun up by applying a constant voltage to the gyro motor from a lab power supply (Tektronix PS280). The gyro spinning rate was determined using the back e.m.f. frequency of the gyro motor recorded with a Tektronix THS 730A digital storage oscilloscope. The load impedance was measured with the Fluke 87 DMM. The electrical generator's load impedance was set to 100 ohms. During the run wave frequencies were held constant for 30 seconds before stepping in 0.25 Hz. increments until the maximum frequency of 1.5 Hz was reached. Then the wave frequency was stepped down in 0.25 Hz increments until the minimum of 0.25 Hz. was reached marking the end of the run. Each run was performed 3 times.

Measurements of the generated power as a function of the electrical load were also obtained by decreasing the load impedance from the initial value of 100 ohms to 50 ohms and 33 ohms and gyro angular velocities set to 65 and 90 r.p.s.

A Maximum Load Test was conducted (at the previous range of wave frequencies and gyro rates) in which the load was increased using a 100 watt Ohmite rheostat until the crank arm stopped rotating synchronously, then decreased just enough to restore synchronous rotation. Under this condition, the voltage generated and the final load impedance were recorded using an averaging D.M.M. Then the power was calculated to determine the maximum power the system could generate at a specific gyro rate and a specific wave frequency.

Another bench test, Self-Powered Gyro Test, was conducted with the Gyro-Gen operating autonomously by using the generated power to spin the gyroscope. The gyro was initially spun by the bench power supply at 80 r.p.s. The gyro motor was then switched to the electric generator, which was also loaded with 100 ohms and driven by the test frame at 1.5 Hz wave frequencies until the gyro rate was stabilized. The wave frequency was decreased to 1.25 Hz and the gyro's angular velocity was again allowed to stabilize.

Figure 7A:
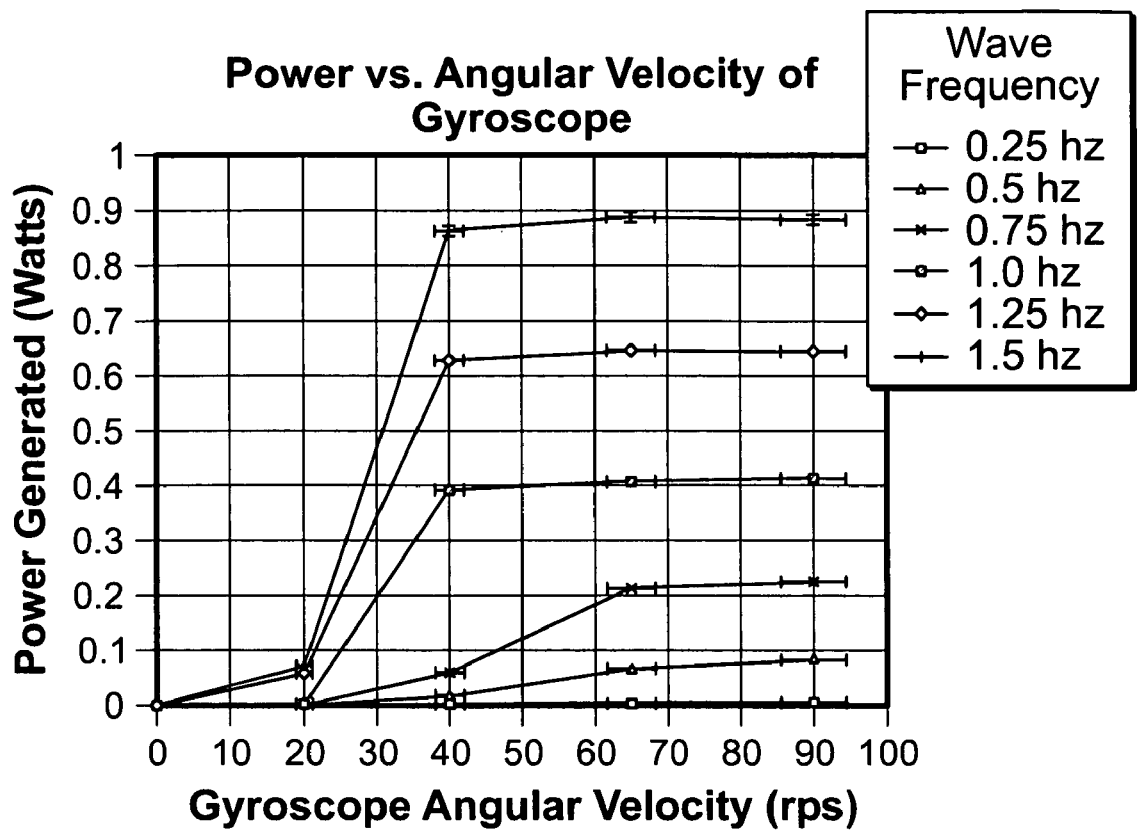
FIGS. 7, 8, 9 and 10 show measured data in a simplified testing prototype for the design in FIG. 4.

FIGS. 7A, 7B, 8A, 8B, and 9 show power measurements of the prototype Gyro-Gen with the test frame. FIG. 7A shows the power measurements as a function of the angular velocity of the gyroscope. According to the measurements, when the gyro rate was set to zero, the crank arm failed to make a complete revolution and to synchronize with the wave period simulated by the test frame. When the gyro's angular velocity was increased to 20 r.p.s. the crank arm began to move, but only made partial revolutions at 1.25 and 1.5 Hz waves and did not resonate. When the gyro's rate was increased to 40 r.p.s. and the wave frequency step was 1.0 Hz, the crank arm started to make continuous revolutions and became phase-locked with the wave motion. The generator made continuous revolutions at 1.0, 1.25, and 1.5 Hz waves. At 65 r.p.s. the Gyro-Gen synchronized at all frequencies except 0.25 Hz; at 90 r.p.s., the crank arm phase locked at all wave frequencies. The data indicates that there is a direct relationship between the gyro rate and the ability of the generator to output power.

Figure 7B:
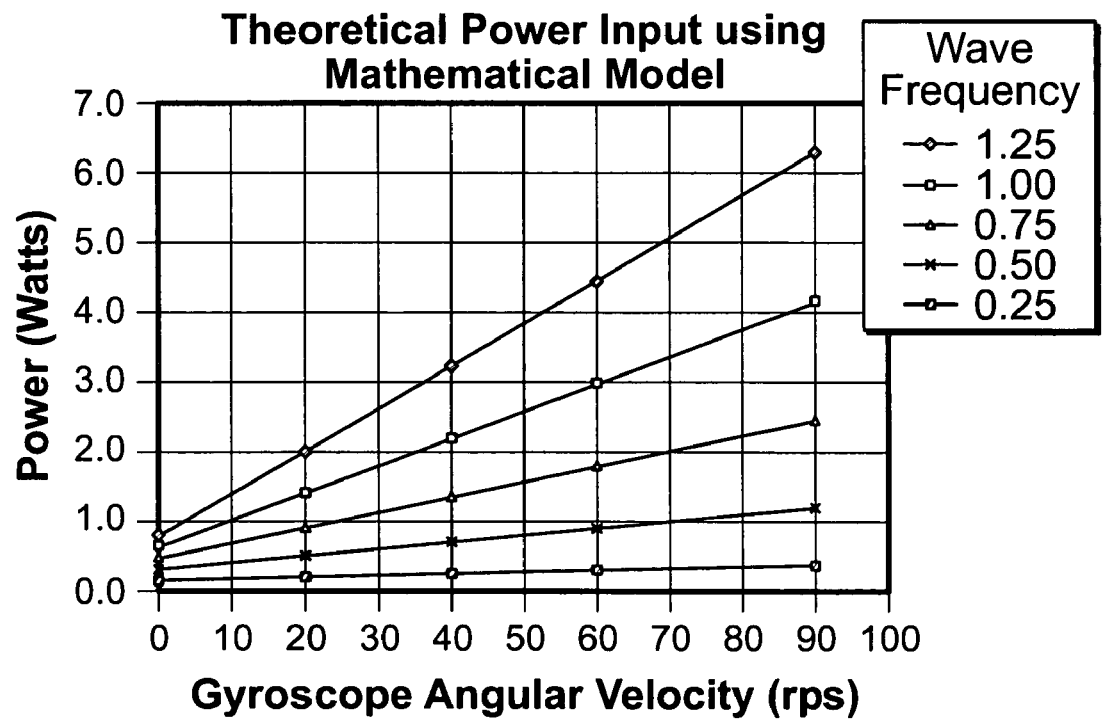

FIG. 7B shows calculated theoretical power using the same parameters as tested for the prototype Gyro-Gen. The calculated results are consistent with the measured results after the losses are accounted for.

Figure 8A:
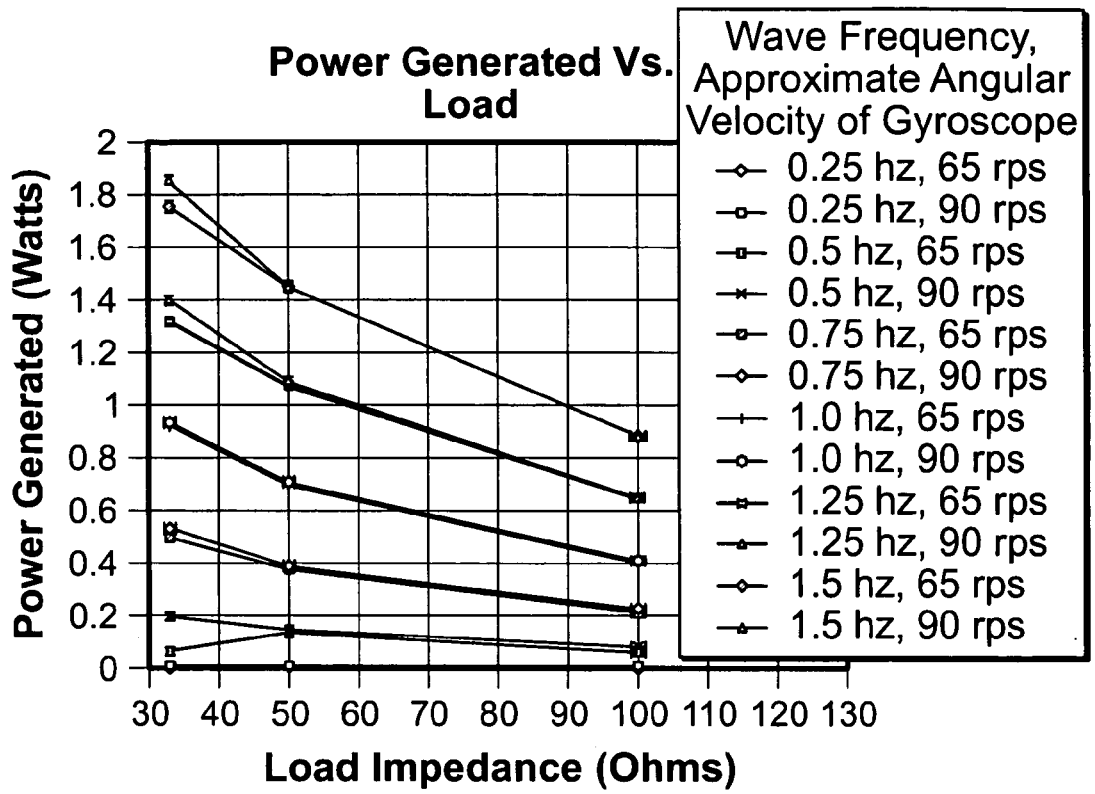
Figure 8B:
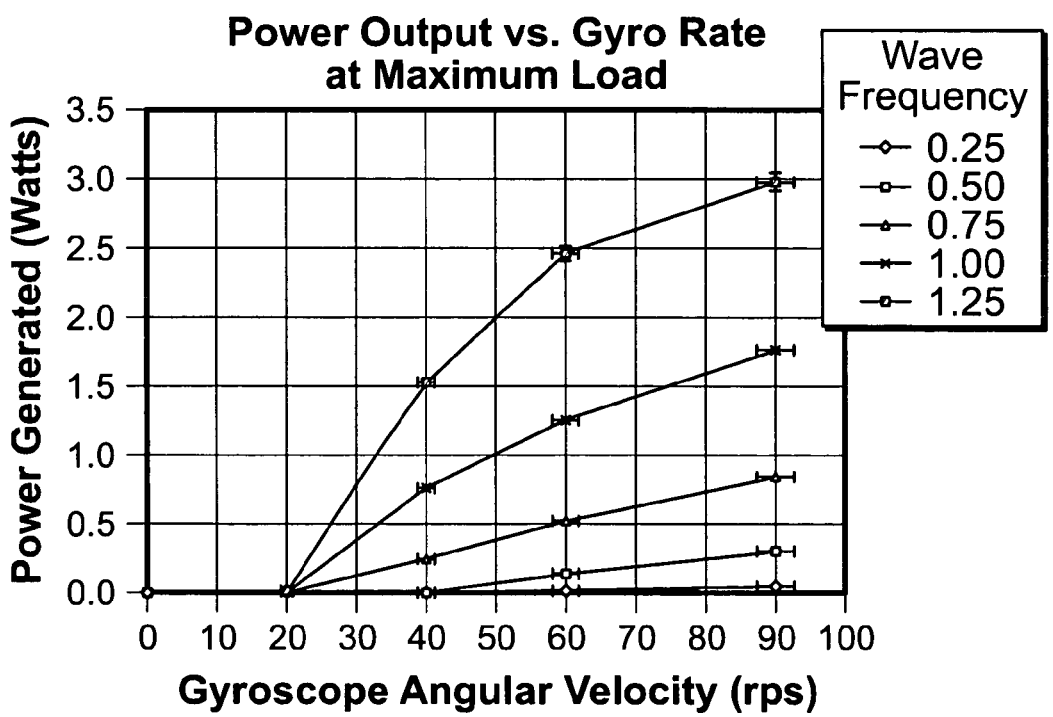

FIG. 8A shows power measurements as a function of the load. When the gyroscope was spinning at both 65 and 90 r.p.s., the increase in load, though dropping the voltage, increased the power output. When the load was increased to 33 ohms, the power output increased for all wave frequencies except 0.5 and 0.25. Results show that there is an optimal electrical impedance that should be matched to the mechanical impedance. This optimal electrical impedance can be determined by the gyro rate, the buoyant force and the wave frequency. To test this, a maximum load test was conducted and FIG. 8B shows the results. Comparing data in FIG. 7A to the same test conducted at "maximum load" in FIG. 8B, the power generated was substantially increased. For example, at a 90 r.p.s. gyro rate with a 1.25 Hz wave frequency, the power output at a fixed load of 100 ohms was less than 0.7 watts, whereas at "maximum load" of 6.3 ohms, the output was 3.0 watts, greater than a 400 percent increase in power. Similar large increases were observed at all gyro rates above 20 r.p.s. At a wave frequency of 1.25 Hz, the power levels off as the load approaches the source impedance of the generator. The 1.5 Hz frequency was not recorded because the output power went beyond the range of the stepper motor generator. These results indicate that for the practical wave-powered-generator, a controllable gyro rate and electrical load can be used to adapt to different wave frequencies to improve the conversion efficiency.

The efficiency of the system can be estimated by dividing the net power (maximum power generated minus the gyro motor power) by the total power at maximum output and adding all measurable system losses. For example, at 90 r.p.s. and 1.25 Hz, the power output of gyro motor plus load was 2.98 watts. The gyro motor power was 2.16 watts, so that the net output power was 0.817 watts. Adding the total losses, the diode bridge loss was 1.13 watts and the generator's internal resistance loss was 1.042 watts. The total measured power dissipation equals 5.122 watts. This compares well with the theoretical total power input of 6.17 watts. The corresponding efficiency is 0.817 watts/5.12 watts, or 16%. Using the theoretical power input instead of the measured power output the efficiency is 13%. Noting losses in the diode bridges, the rectifiers were replaced with Schottky diodes and efficiency increased to 18.4%.

Figure 9:
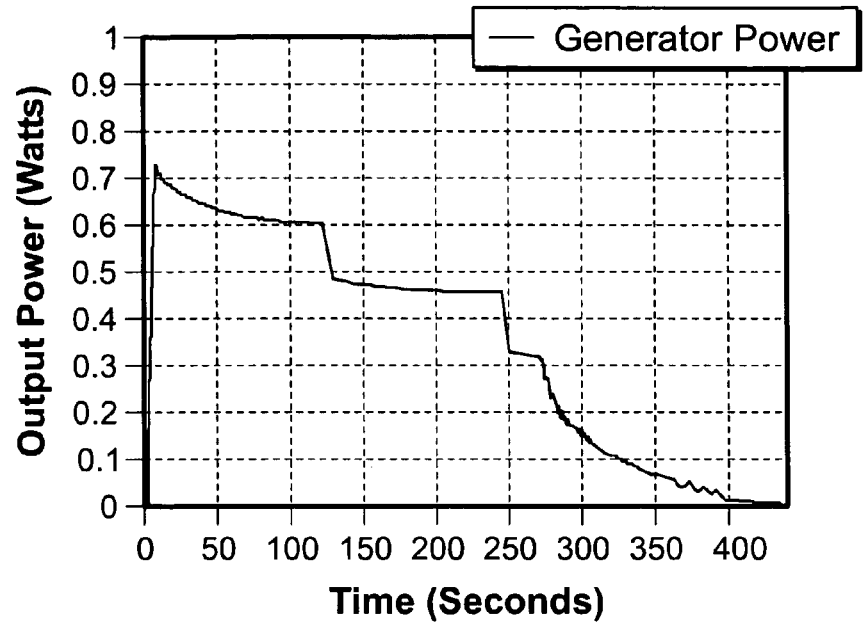

FIG. 9 shows that after the initial rate of 80 r.p.s, driven at a wave frequency of 1.5 Hz, the gyro's angular velocity decreased, then stabilized, with the crank arm rotating synchronously, thus the generator was able to continuously power both the load and the gyro motor. When the wave frequency was stepped down to 1.25 Hz, the same results occurred. At 1.0 Hz the output was insufficient to sustain the gyro and the system eventually stopped. Results indicate that when the gyro motor was powered by the generator output, the system became self-sustaining, converting enough energy to maintain the gyro rotation while powering an auxiliary load.

The above Gyro-Gen as mounted in a watertight (60.6 liter Rubbermaid Roughneck) utility tub to form a prototype based on the design in FIG. 5 for conducting sea tests. The utility tub was used as the housing 510 and was made watertight with a Plexiglas disk sealed with Teflon gasket. The Plexiglas disk was 0.56 cm thick and 54.6 cm in diameter. The buoy was ballasted with 3.4 kg dumbbell weights and 25.4 cm Unistrut® brackets in a radial keel configuration were installed on the utility tub to maximize wave power input to the hull. A data recorder was installed and acceleration and voltage recorded at 10 samples per second at constant gyro speed and electrical load. Measurements under various operating conditions are called "Runs" in this specification. For Run 1, four brackets were as keels, in Run 2 one bracket was used along with the 3.4 kg weight, in Runs 3-7 four bracket keels and 3.4 kg ballast were used. Gyro angles for Runs 3-7 ranged from 90 to 0 degrees in 30 degree increments used the standard settings of 10 cm crank arm.

Figure 10:
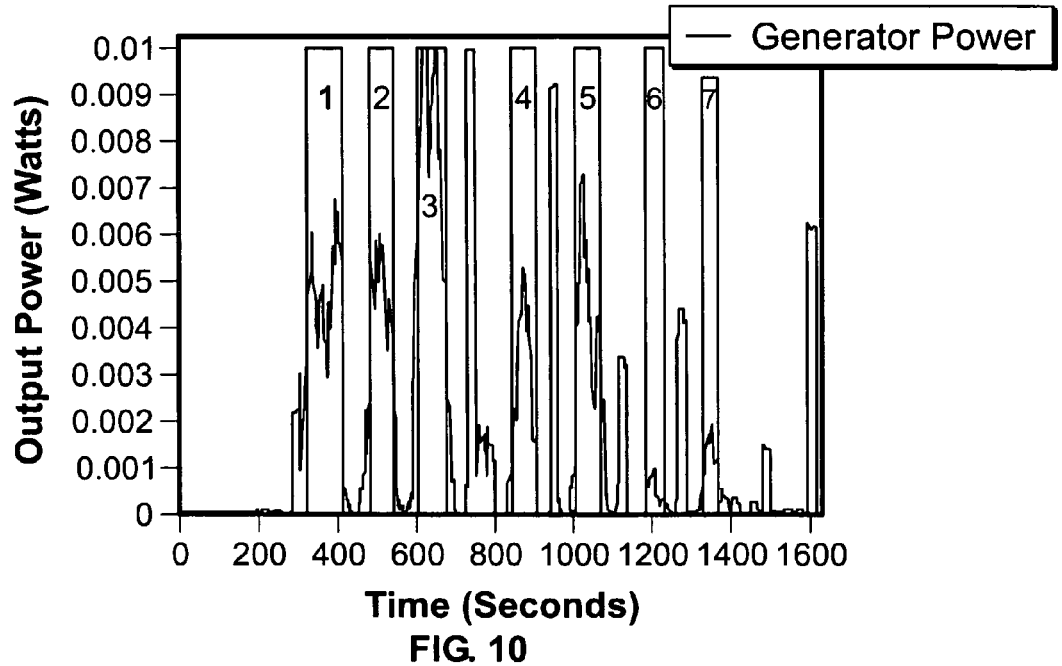
Figure 12:
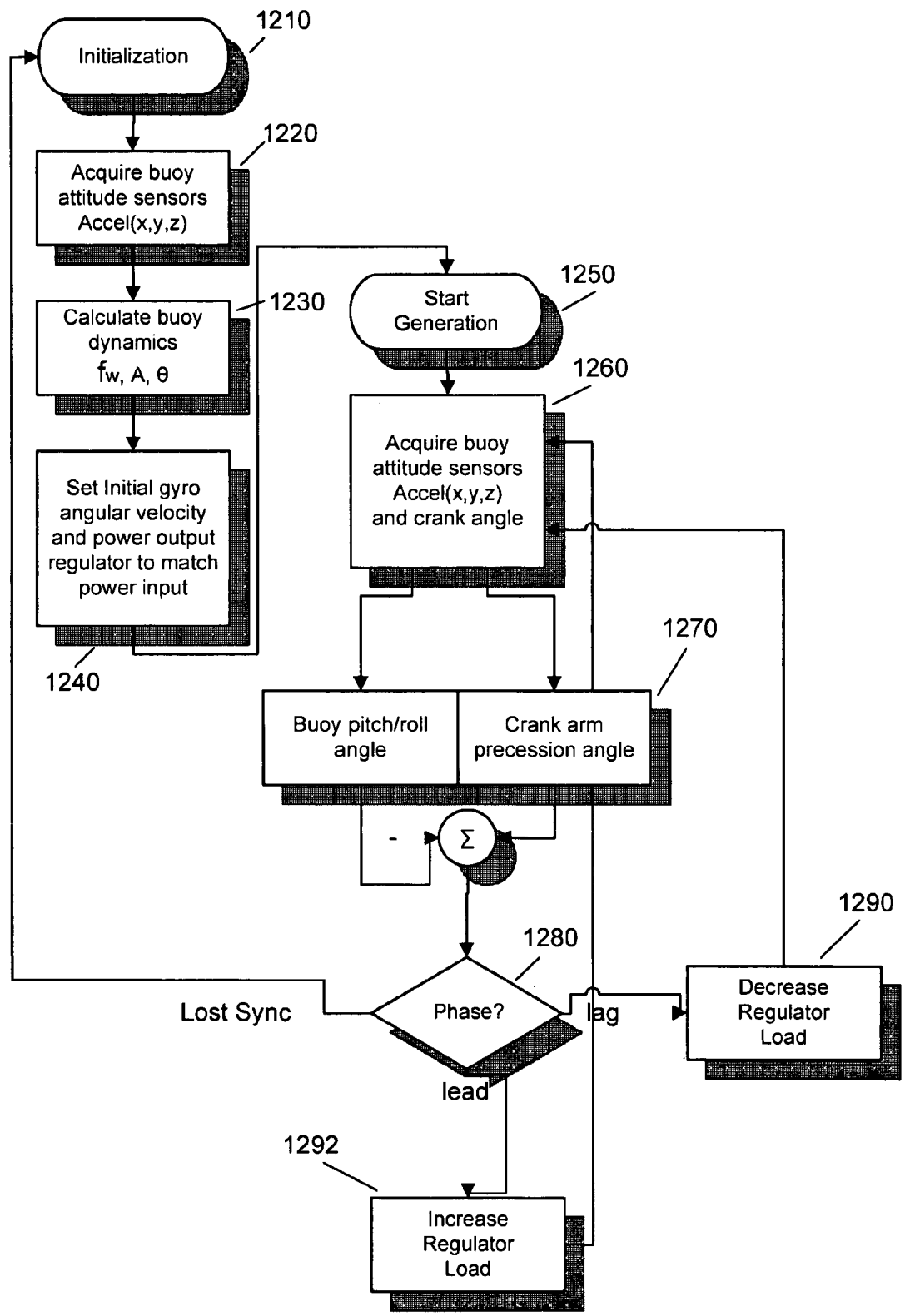
FIG. 12 shows an exemplary operation of the system controller in the buoyant gyroscope generator.

Ocean testing included seven test runs shown in FIG. 10. In the first three tests, the keel design and ballast were varied and the best results were observed with 4 Unistrut bracket keels and 3.4 kilos (7.5 lb) ballast. This set up was kept throughout all remaining runs (FIG. 12). Run 3, with the standard settings of 10 cm crank arm radius and 90 degree angle gyro, generated the most power of any sea tests. Run 7 (gyro angle at 0.0 degrees) generated the least power of the runs performed with the gyro on. Run 6 (gyro off) revealed far lower power output than any other run. For example, in Run 3, with the optimal keel design, the output was more than ten times greater with the gyro rotating than when stopped. The contrast in power output between runs with and without the gyro rotating suggests that precessional torque converts periodic wave energy into the rotary motion of the crank arm.

The above test results demonstrate that power generation based on gyroscopic precession is a viable technology for an autonomous wave-powered generator. The prototype Gyro-Gen successfully generated sufficient power to run both the gyroscope and an auxiliary load. Hence, the gyroscope can be used to efficiently transfer power from periodic angular motion into electricity. The test results further show that the crank arm could generate little power without the gyro's precessional torque. As the angular momentum of the gyroscope increases, the amount of the potential torque to the generator and the electrical power output increase accordingly. Notably, the load can be controlled in order to achieve the maximum power output. Both experimental and theoretical results indicate that the electrical load and the angular momentum of the gyro are interrelated, i.e., if the angular momentum on the gyro is increased, it only helps to a certain point before the load must be increased. For instance, as indicated in FIG. 7A, the power output started to level off at 40 r.p.s. for frequencies of 1.0 Hz and above, and at 60 to 65 r.p.s. for wave frequencies of 0.25 Hz to 0.75 Hz. In FIG. 8B, power outputs at all wave frequencies continued to increase with the gyro angular velocity. A maximum of 3.0 watts into a 6.3-ohm load was generated at a wave frequency of 1.25 Hz and a gyro rate of 90 r.p.s. Efficiency calculations show that it is important to keep electrical and frictional losses as low as possible.

Sea tests of the prototype Gyro-Gen show that a rotating gyro increased the power output significantly. The buoy design in FIG. 5 was effective and efficient in converting the wave energy into electricity. In particular, the addition of the radial-blade keel and ballast configuration resulted in higher output. Independent sea-state data at the same time and location of the tests indicated the significant wave height was approximately 0.5 meter at a period of approximately 12 seconds. See, Coastal Data Information Program, Integrative Oceanography Division, Scripps Institution of Oceanography, "Energy Spectrum Monthly Plot: 073 Scripps Pier," [Online document] (March 2004), Available HTTP: http://cdip.ucsd.edu/?nav=historic&stn=073&stream=p1&sub=data&xyrmo=200403&xitem=product8. Although the wave period was beyond the range of the prototype, the results still support the conclusion that gyroscopic precession increases power output.

The present gyroscope-based generator may be implemented in a large scale to increase the power output. As an example, assume a gyroscope with a moment of inertia of about 30 [kg·m$^2$] is used. This is approximately equivalent to the moment of inertia of a 250 [kg] disk with a radius of 0.5 [m]) spinning at 200 [r.p.s]. The angular momentum of this large gyroscope is approximately 3600 [kg·m$^2$·ω]. Thus a Gyro-Gen buoy containing a single gyroscope mechanism with the above large gyroscope can generate approximately 2340 Watts in little more than one cubic meter of space excluding the buoy hull assuming the buoy pitches at ±15 degrees on a 10 second period wave. Therefore, depending on the power requirements, gyroscope-based generators may be sized to provide sufficient power outputs for different applications.

Figure 11A:
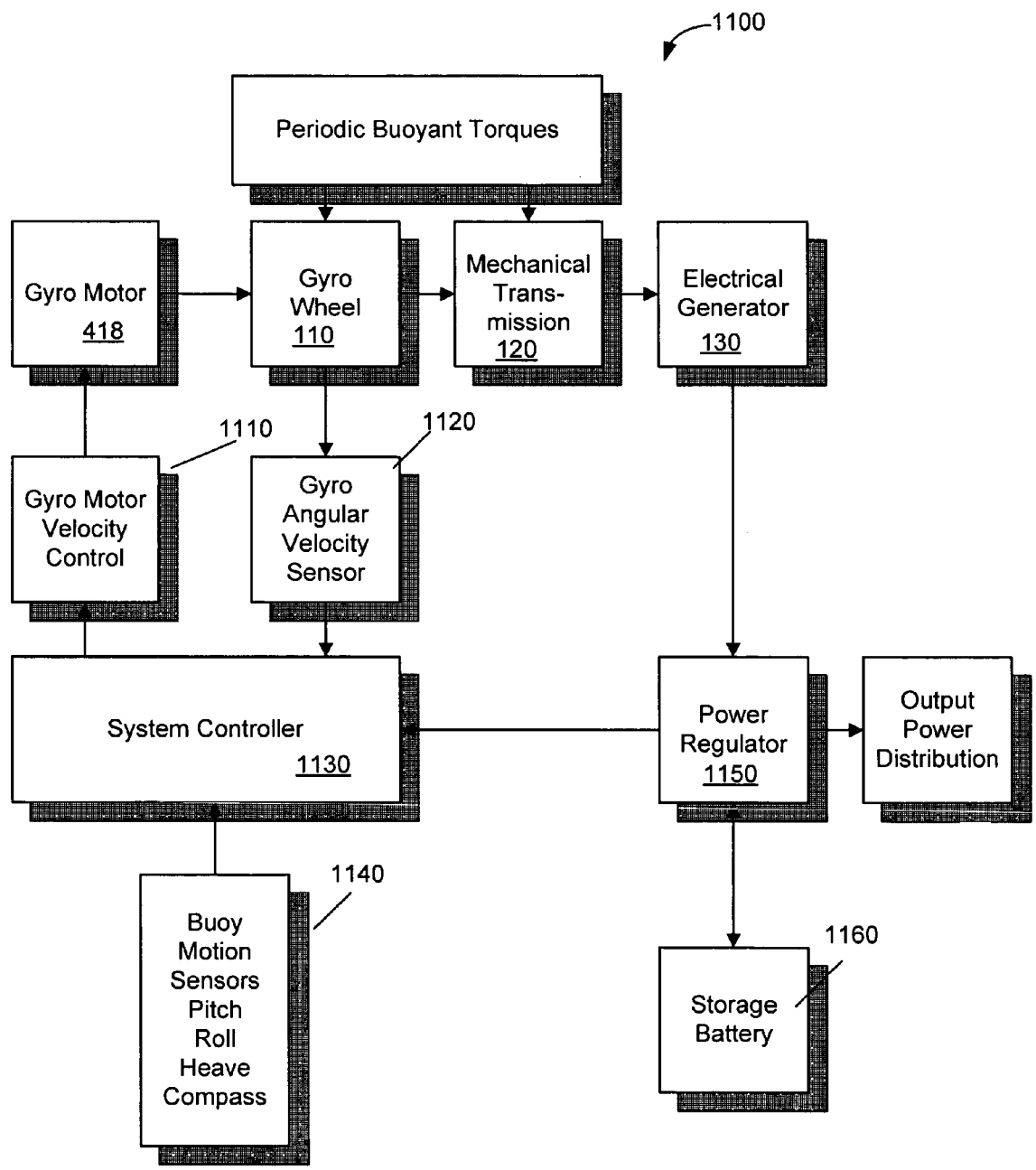
FIGS. 11A and 11B show block diagrams of two exemplary gyroscope-based generators that implement a system controller and a power regulator based on various sensors.

FIG. 11A further shows a block diagram of an exemplary gyroscope-based generator 1100 that implements a system controller 1130 and a power regulator 1150. The power regulator 1150 is connected to receive generated electrical power from the electrical generator 130. A regulation signal 1152 is sent to the system controller 1130 to inform the system controller of the status of the regulator load. A gyro angular velocity sensor 1120 is coupled to the gyro wheel of the gyroscope 110 to measure the angular velocity. The measured angular velocity is fed to the system controller 1130. In addition, one or more motion sensors 1140 for measuring the pitch, roll, and heave parameters of the whole system caused by the periodic or oscillating torque that acts on the gyroscope 110 and possibly the transmission 120. The measurements from the one or more sensors 1140 are sent to the system controller 1130.

The system controller 1130 processes the measurements from the sensors 1120 and 1140 and the load information from the power regulator 1150 and dynamically controls the angular velocity of the gyroscope 110 by producing a gyro motor velocity control signal. A gyro motor velocity control unit 1110 is provided to respond to the control signal and to control the gyro motor 418 accordingly. The gyro motor 418, in turn, drives the gyroscope 110 at a desired gyro angular velocity. Hence, this control feedback is dynamic in the sense that the gyro angular velocity is adjusted with changes in the external periodic torque and the load. The power regulator 1150 splits the power from the generator 130 into a first portion as the output for distribution, e.g., driving an electronic device or an electrical appliance, and a second portion to a storage battery 1160. The storage battery may be used as the power supply for the gyro motor 418.

Figure 11B:
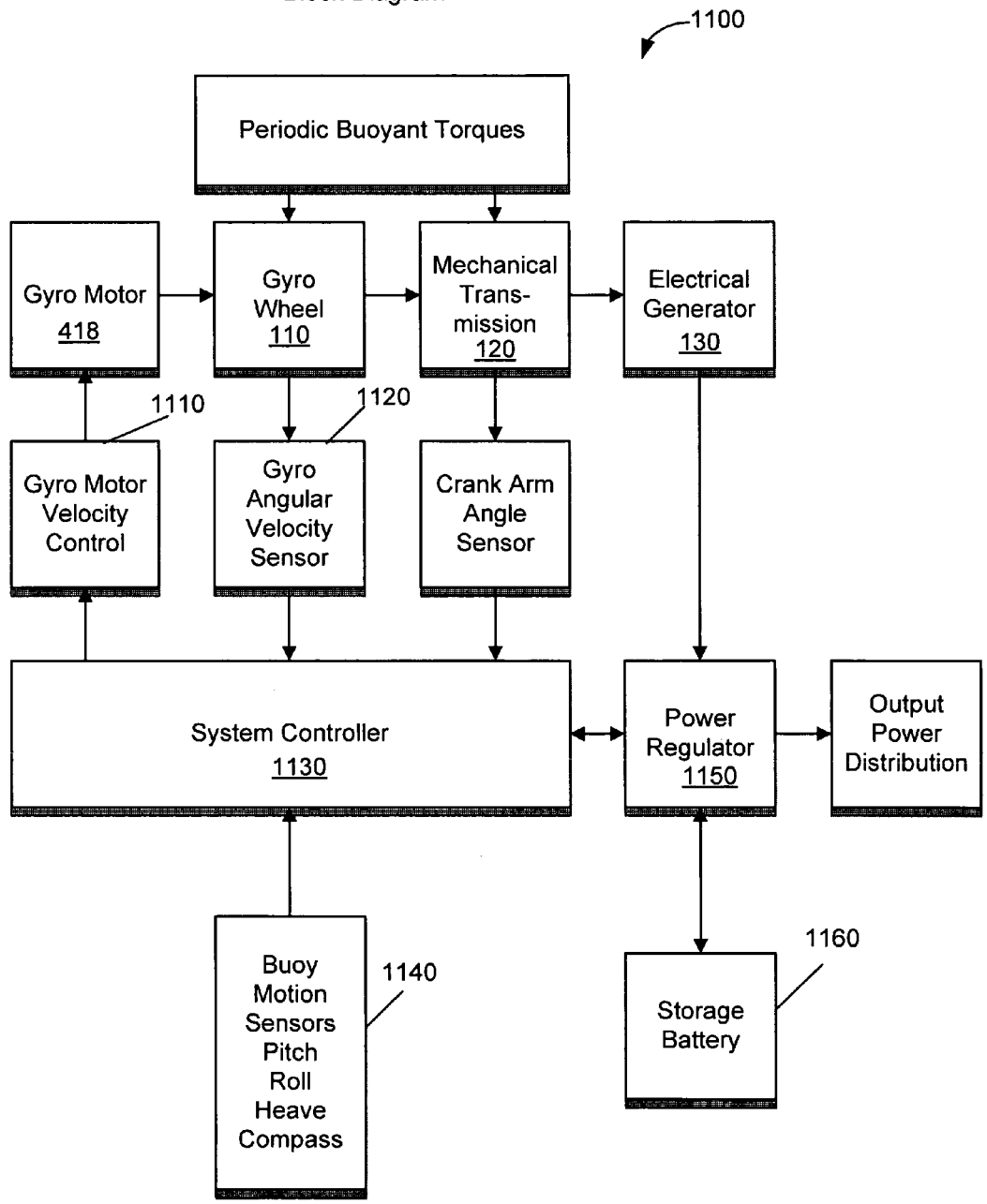

FIG. 11B shows another implementation based on the design in FIG. 11A where a crank arm angle sensor is used to measure the angle of the crank arm and feeds the angle measurement to the system controller 1130. The system controller 1130 can process and use this information, in addition to other information (e.g., gyro angular velocity and the buoy motion parameters), to control the velocity of the gyro motor and thus the spinning speed of the gyroscope.

FIG. 12 shows an exemplary operation of the system controller 1130 in the device 1100 as a buoyant system. First, the system is initialized at step 1210 to, e.g., power up the gyroscope and check communications with different parts of the systems such as the sensors. At step 1220, the attitude measurements from the sensors 1140 are acquired by the system controller 1130. At step 1230, the buoy dynamics is computed to determine the power input from the external periodic torque. The system controller 1130 sets the initial gyro angular velocity and power output regulator to match the power input. This is the step 1240. At this time, the generator 130 begins to generate electricity (step 1250). The system controller 1130 further acquires attitude measurements from sensors 1140 to extract the buoy pitch and roll angles (step 1260 and 1270). At step 1280, the system controller 1130 determines whether the pitch, roll, and crank arm precession angle are in phase with each other. The regulator load is adjusted to increase or decrease in order to maintain the phase between the pitch, roll, and crank arm precession angle. If the pitch and roll are not synchronized, the system initialization and subsequent steps are performed get the system back to the "normal" operation.

Figure 13:
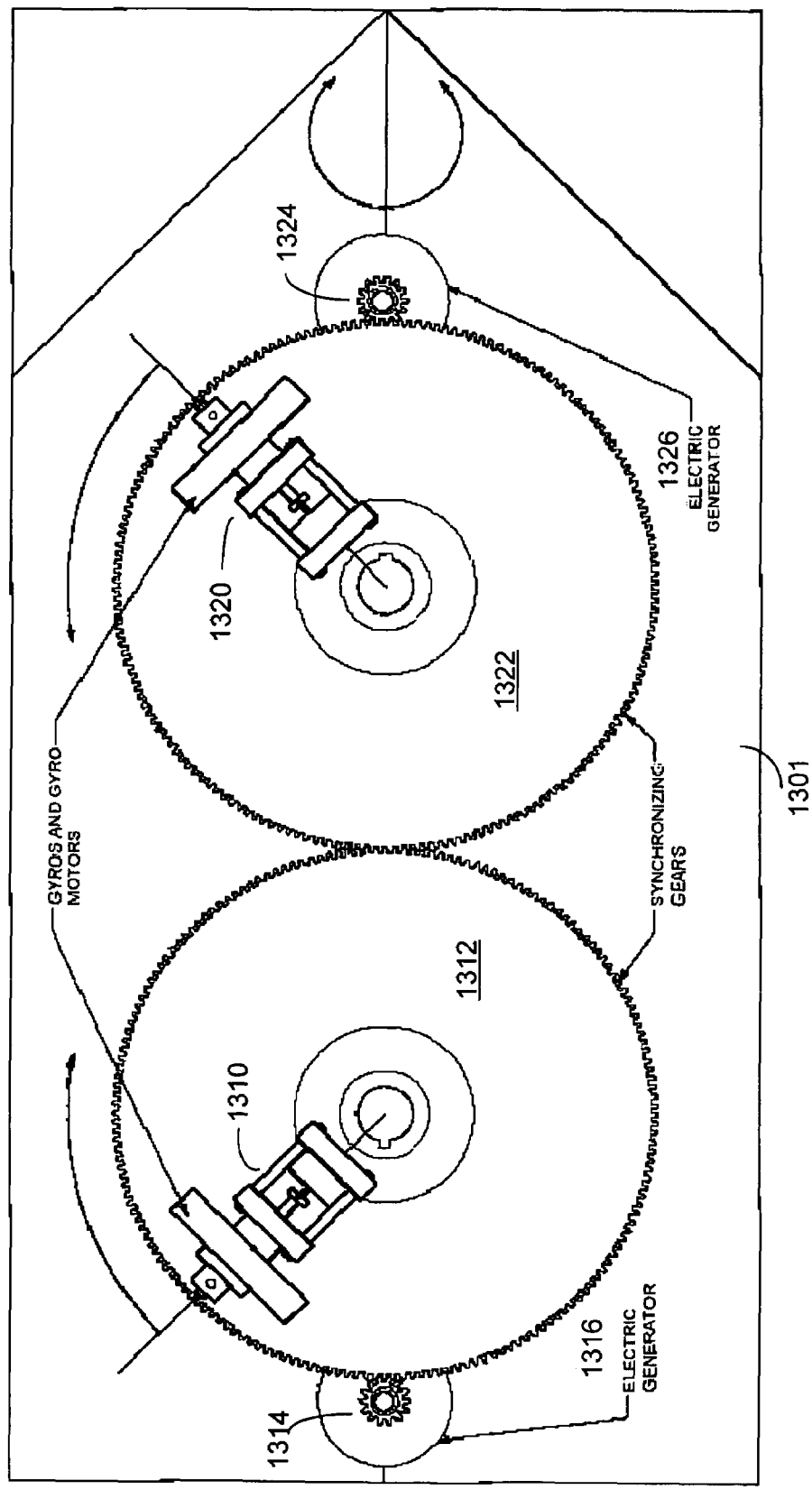
FIG. 13 shows one example of a gyroscope-based generator where two gyroscopes are used and coupled to each other.

In the above examples, only a single gyroscope is used in a gyroscope-based generator. In other implementations, two or more gyroscopes may be used in a generator to achieve certain operating advantages. FIG. 13 shows one example of a gyroscope-based generator 1300 where two gyroscopes 1310 and 1320 are used. The first gyroscope 1310 is fixed to a transmission gear 1312 which may be a circular plate or a cylinder with a geared edge. The precession of the gyroscope 1310 causes the transmission gear 1312 to rotate with the precession. Similarly, the second gyroscope 1320 is fixed to a second transmission gear 1322 which may be a circular plate or a cylinder with a geared edge. The precession of the gyroscope 1320 causes the transmission gear 1322 to rotate with the precession. The two transmission gears 1312 and 1322 are engaged at their geared edges to rotate in opposite directions and are synchronized with each other. Two electric motor-generators 1316 and 1326 are respectively engaged to the transmission gears 1312 and 1322 and are driven to produce electricity. As illustrated, gears 1314 and 1324 are used to engage the transmission gears 1312 and 1322 to the rotary motor-generators 1316 and 1326, respectively. The control mechanism described in FIGS. 11 and 12 may be applied to the dual-gyroscope generator 1300. A common base 1301 is used to support both gyroscopes and to cause both gyroscopes to react to the same oscillating motion.

In summary, only a few implementations are disclosed. However, it is understood that variations and enhancements may be made.

What is claimed is:

1. A method for using a gyroscope to generate electricity, comprising:

engaging a crank arm to an electromagnetic motor-generator to be rotatable in full revolutions around a motor rotation axis of the electromagnetic motor-generator that is perpendicular to the crank arm;

fixing a gyroscope onto the crank arm at a location away from an interception between the motor rotation axis and the crank arm so that the gyroscope moves with the crank arm and to align a spinning axis of a gyroscope wheel in the gyroscope along a radial direction of a rotation of the crank arm around the motor rotation axis;

providing a base, on which the electromagnetic motor-generator is mounted at a fixed position, to interact with an external oscillating motion so as to cause the spinning gyroscope to precess and to cause rotation of the crank arm around the motor rotation axis so as to convert the external oscillating motion into a continuous rotation motion of the crank arm around the motor rotation axis; and controlling a spinning speed of the gyroscope wheel of the gyroscope in response to an oscillating frequency of the external oscillating motion to sustain the continuous rotation motion of the electromagnetic motor-generator to generate electricity.

2. The method as in claim 1, further comprising:

providing a buoy engaged to the base to transfer the oscillating motion of the buoy when floating on water waves into a precession motion of the gyroscope.

3. The method as in claim 2, further comprising:

controlling the spinning speed of the gyroscope to cause a precession frequency of the gyroscope to be resonant with a frequency of the oscillating motion of the water waves.

4. The method as in claim 2, further comprising causing an electrical impedance of the electromagnetic motor-generator to match a mechanical impedance of the buoy, the gyroscope, and the electromagnetic motor-generator.

5. The method as in claim 1, further comprising:

providing a power supply to the gyroscope to at least initiate spinning of the gyroscope.

6. The method as in claim 5, further comprising:

providing a mechanism to supply a portion of electrical output of the electromagnetic motor-generator to the gyroscope to power the spinning of the gyroscope.

7. The method as in claim 1, further comprising:

providing a power supply to power initial spinning of the gyroscope; and providing a control mechanism to supply the portion of electrical output of the electromagnetic motor-generator to the gyroscope to power the spinning of the gyroscope and to turn off the power supply after the portion of electrical output is sufficient to sustain the spinning of the gyroscope.

8. The method as in claim 1, comprising:

providing motion sensors on the base to monitor motion of the base caused by interacting with the external oscillating motion;

using measurements from the motion sensors to control the spinning speed of the gyroscope.

9. A device for generating electricity, comprising:

a base reactive to an oscillating motion acting on the base to move in response to the oscillating motion;

a gyroscope comprising a gyroscope body and a gyroscope wheel spinning around a gyroscope axis fixed in the gyroscope body and movably engaged to the base to rotate in full revolutions with respect to the base, the gyroscope operable to precess in response to the oscillating motion of the base when the gyroscope wheel is spinning;

an electromagnetic motor-generator fixed in position to the base and comprising a rotor to rotate and to generate electricity; and a coupling unit coupled between the gyroscope and the electromagnetic motor-generator to rotate the rotor of the electromagnetic motor-generator in full revolutions in generating the electricity, wherein the coupling unit is fixed to and processes with the gyroscope in rotating the rotor of the electromagnetic motor-generator in full revolutions to produce a unidirectional torque to the rotor in response to an alternating torque caused by the oscillating motion so as to transfer the precession of the gyroscope to continuous rotation of the electromagnetic motor-generator, thus converting energy of the oscillating motion into electricity, wherein the coupling unit comprises a crank arm that is engaged to the electromagnetic motor-generator to be perpendicular to a rotation axis of the rotor and is engaged and fixed to the gyroscope body to move with the gyroscope body and to place the gyroscope axis to be parallel to the crank arm, and wherein rotation of the crank arm rotates the electromagnetic motor-generator to generate the electricity.

10. The device as in claim 9, further comprising:

a gyroscope driver coupled to supply energy to the gyroscope and to initiate and maintain spinning of the gyroscope.

11. The device as in claim 10, wherein the gyroscope driver is electrically coupled to the electromagnetic motor-generator to receive a portion of the electricity generated by the electromagnetic motor-generator to drive the gyroscope.

12. The device as in claim 11, further comprising a gyroscope power supply that is coupled to the gyroscope driver and supplies energy to initiate spinning of the gyroscope.

13. The device as in claim 12, further comprising a mechanism to cause the gyroscope driver to cease receiving energy from the gyroscope power supply after the portion of the electricity generated by the electromagnetic motor-generator is sufficient to maintain spinning of the gyroscope.

14. The device as in claim 10, wherein the gyroscope driver controls spinning of the gyroscope to make a precession frequency of the gyroscope to be resonant with a frequency of the oscillating motion of the base.

15. The device as in claim 9, wherein the base comprises a mechanism to interact with wind and to make the oscillating motion in response to the wind.

16. The device as in claim 9, wherein the base comprises a floating unit that floats on water and interacts with water waves to make the oscillating motion in response to the water waves.

17. The device as in claim 9, wherein the gyroscope is engaged to the crank arm at a location off a rotation axis of the electromagnetic motor-generator.

18. The device as in claim 9, wherein the gyroscope is engaged to the crank arm at a rotation axis of the electromagnetic motor-generator.

19. The device as in claim 9, wherein the gyroscope is engaged to the crank arm at a location away from the crank arm along a direction parallel to a rotation axis of the electromagnetic motor-generator.

20. The device as in claim 9, further comprising:

a floating device to float in water, wherein the base is engaged to the floating device to make the rotation axis of the electromagnetic motor-generator to be substantially perpendicular to the water surface.

21. The device as in claim 20, further comprising a waterproof housing engaged to the floating device to enclose at least the gyroscope and the electromagnetic motor-generator.

22. The device as in claim 9, further comprising an electrical load device coupled to the electromagnetic motor-generator to receive the electricity.

23. The device as in claim 22, wherein the electrical load device comprises a rechargeable battery to store at least a portion of the electricity.

24. The device as in claim 9, wherein the coupling unit comprises a wheel to which the gyroscope is engaged to rotate when in precession, and wherein the wheel is engaged to rotate the electromagnetic motor-generator.

25. The device as in claim 24, further comprising:
a second gyroscope engaged to the base and operable to precess in response to the oscillating motion of the base when the second gyroscope is spinning;
a second electromagnetic motor-generator engaged to rotate with precession of the second gyroscope and to generate electricity; and
a second wheel to which the second gyroscope is engaged to rotate when in precession, the second wheel engaged to the second electromagnetic motor-generator to transfer the precession of the gyroscope to rotation of the second electromagnetic motor-generator, thus converting energy of the oscillating motion into electricity,
wherein the second wheel and the wheel are engaged to counter rotate with respect to each other.

26. A device for generating electricity, comprising:
a floating device to float in water;
a base engaged to the floating device to be substantially parallel to a water surface at a location where the base is located;
a gyroscope movably engaged to the base to rotate in full revolutions with respect to the base and operable to precess with respect to the base around a procession axis that is perpendicular to the base and the water surface, when the gyroscope is spinning, in response to an oscillating motion of the base when floating on the water;
an electromagnetic motor-generator engaged to the base at a fixed position and comprising a rotor to rotate around a motor rotation axis and to generate electricity;
a crank arm engaged to the electromagnetic motor-generator to be perpendicular to the motor rotation axis and operable to rotate the rotor of the electromagnetic motor-generator around the motor rotation axis and engaged to the gyroscope so that an entirety of the gyroscope is fixed to and moves with the crank arm in full revolutions with an axis of the spinning of the gyroscope being parallel to the crank arm and perpendicular to the motor rotation axis, the crank arm operable to precess with the gyroscope to rotate around the motor rotation axis in full revolutions and to transfer the precession of the gyroscope into continuous rotation of the electromagnetic motor-generator, thus converting energy of the oscillating motion into electricity; and
a control module coupled to control spinning of the gyroscope according to a frequency of the oscillating motion.

27. The device as in claim 26, wherein the control module further comprises a sensing mechanism to monitor motion of the oscillating motion and operates to dynamically adjust spinning of the gyroscope to set a frequency of the precession of the gyroscope to be resonant with a frequency of the monitored oscillating motion.

28. The device as in claim 26, wherein the control module further comprises a sensing mechanism to monitor motion of the oscillating motion and operates to dynamically adjust an electrical load of the electromagnetic motor-generator according to the monitored oscillating motion.

29. The device as in claim 28, wherein the sensing mechanism comprises motion sensors that provide measurements on pitch and roll motions of the floating device, and
wherein control module is operable to adjust the electrical load in response to a comparison between the measurements on the pitch and roll motions of the floating device and the precession of the gyroscope.

30. A method for using a gyroscope to generate electricity, comprising:
engaging a crank arm to an electromagnetic motor-generator to be rotatable in full revolutions around a motor rotation axis of the electromagnetic motor-generator that is perpendicular to the crank arm;
fixing a gyroscope onto the crank arm so that the gyroscope moves with the crank arm and to align a spinning axis of a gyroscope wheel in the gyroscope along a radial direction of a rotation of the crank arm around the motor rotation axis;
providing a base, on which the electromagnetic motor-generator is mounted at a fixed position, to interact with an external oscillating motion so as to cause the spinning gyroscope to precess and to cause rotation of the crank arm around the motor rotation axis so as to convert the external oscillating motion into a continuous rotation motion of the crank arm around the motor rotation axis;
controlling a spinning speed of the gyroscope wheel of the gyroscope in response to an oscillating frequency of the external oscillating motion to sustain the continuous rotation motion of the electromagnetic motor-generator to generate electricity;
providing motion sensors on the base to monitor motion of the base caused by interacting with the external oscillating motion;
using measurements from the motion sensors to control the spinning speed of the gyroscope;
comparing pitch and roll motions of the base obtained from the motion sensors to the procession motion of the precessing gyroscope; and
adjusting an electrical load to the electromagnetic motor-generator based on a comparison between the pitch and roll motions of the base to the procession of the precessing gyroscope.

* * * * *

UNITED STATES PATENT AND TRADEMARK OFFICE
CERTIFICATE OF CORRECTION

| | | |
|---|---|---|
| PATENT NO. | : 7,375,436 B1 | Page 1 of 1 |
| APPLICATION NO. | : 11/280521 | |
| DATED | : May 20, 2008 | |
| INVENTOR(S) | : Aaron Goldin | |

It is certified that error appears in the above-identified patent and that said Letters Patent is hereby corrected as shown below:

Column 13, line 62, (Claim 9) delete "processes" and insert --precesses--;

Column 15, line 25, (Claim 26) delete "procession" and insert --precession--;

Column 16, line 46, (Claim 30) delete "procession" and insert --precession--;

Column 16, line 50, (Claim 30) delete "procession" and insert --precession--;

Signed and Sealed this

Fifth Day of August, 2008

JON W. DUDAS
*Director of the United States Patent and Trademark Office*